United States Patent
Barber et al.

[11] Patent Number: 6,014,477
[45] Date of Patent: Jan. 11, 2000

[54] ARTICLE COMPRISING A PHOTOSTRICTIVE SWITCHING ELEMENT

[75] Inventors: Bradley Paul Barber, Basking Ridge; David John Bishop, Summit; Nicholas J. Frigo, Red Bank; Peter Ledel Gammel, Millburn, all of N.J.

[73] Assignees: AT&T Corp., Middletown; Lucent Technologies Inc., Murray Hill, both of N.J.

[21] Appl. No.: 08/926,213

[22] Filed: Sep. 9, 1997

[51] Int. Cl.[7] ......................................... G02B 6/26
[52] U.S. Cl. .................. 385/16; 385/15; 385/17; 385/18; 385/24
[58] Field of Search .................... 385/4, 5, 8, 9, 385/15, 16, 17, 24, 18

[56] References Cited

U.S. PATENT DOCUMENTS

| | | | |
|---|---|---|---|
| 4,861,136 | 8/1989 | Stone et al. | 350/96.3 |
| 5,095,515 | 3/1992 | Seaver | 385/16 |
| 5,202,790 | 4/1993 | Uchino et al. | 359/323 |
| 5,285,305 | 2/1994 | Cohen et al. | 359/110 |
| 5,321,541 | 6/1994 | Cohen | 359/127 |
| 5,383,048 | 1/1995 | Seaver | 359/279 |
| 5,502,781 | 3/1996 | Li et al. | 385/4 |
| 5,774,259 | 6/1998 | Saitoh et al. | 359/315 |

OTHER PUBLICATIONS

Abstract of the *Journal of the Ceramic Society of Japan*, by T. Sada et al., vol. 95(5), p. 545 (1987).
"Photostictive Effect in $(Pb,La)(Zr,Ti)O_3$", by K. Uchino et al., *Ferroelectrics*, vol. 64, pp. 199–208.
"Ceramic Actuators: Principles and Applications", by K. Uchino, *MRS Bulletin*, vol. 18(4), p. 42 (Apr. 1993).
"Passive Optical Local Networks for Telephony Applications and Beyond", by J. R. Stern et al., *Electronics Letters*, vol. 23, No. 24, Nov. 19, 1987, pp. 1255–1257.

*Primary Examiner*—Brian Healy
*Attorney, Agent, or Firm*—Eugen E. Pacher

[57] ABSTRACT

A switching element according to this invention comprises a photostrictive member. Exposing the member to control light results in a dimensional change in the material. This change is utilized for changing the relative position between an optical fiber and another element, exemplarily a further fiber, a corrugated member, or a mirror, such that signal radiation is directed to a predetermined output port. A variety of exemplary switching elements are disclosed, including interferometric, beam-steering, evanescent field and mode conversion switching elements. Disclosed are also optical communication systems that utilize such switching elements, including passive optical networks.

19 Claims, 5 Drawing Sheets

ARTICLE COMPRISING A PHOTOSTRICTIVE SWITCHING ELEMENT

FIELD OF THE INVENTION

This invention pertains to articles (e.g., an optical fiber communication system) that comprise a photostrictive switching element.

BACKGROUND

Switching elements are an important feature of many optical communication systems. Herein we are using the term "switching element" broadly, to include any element that changes, in response to a control stimulus, the characteristics of an optical transmission path.

Examples of switching elements are elements that direct signal radiation (herein electromagnetic radiation frequently is referred to as "light", regardless of wavelength) to a selected one of a multiplicity of optical waveguides (1×N switch; $N \geq 1$), or elements that either transmit or reflect the light, depending on the control stimulus. More generally, switching elements are elements that cause a change in amplitude, frequency or polarization of the signal radiation in response to a change in the control stimulus.

Although various types of switching elements are known, it would be of interest if still more such elements were available to the designers of optical fiber communication systems, to facilitate optimization of the systems in terms of performance as well as cost. This application discloses a family of novel switching elements, and articles and systems (collectively "articles") that comprise the elements..

The photostrictive effect is known. It is a phenomenon in which strain is induced in a sample of material when the sample is illuminated. See, for instance, K. Uchino et al., "Ferroelectrics", Vol. 64, pp. 199–208, Gordon and Breach, 1985, and K. Uchino, MRS Bulletin, Vol. 18(4), p. 42 (April 1993), both incorporated herein by reference. See also the abstract of T. Sada et al., *J. of the Ceramic Society of Japan*, Vol. 95 (5), p. 545 (1987), also incorporated herein by reference.

U.S. Pat. No. 5,502,781, which is also incorporated herein by reference, discloses integrated optical switching elements which utilize a magnetostrictively, electrostrictively or photostrictively induced stress to alter the optical properties of a planar optical waveguide. The stress-inducing material typically is in the form of a patterned thin film that overlies the planar waveguide. Such switching elements are relatively costly, and typically require coupling of the planar waveguide to optical fiber, with attendant significant insertion loss. The herein disclosed photostrictive switching elements typically can be produced relatively inexpensively and generally do not require fiber-to-planar-waveguide coupling.

SUMMARY OF THE INVENTION

In a broad aspect the invention is embodied in an article (e.g., an optical communication system) that comprises a photostrictive switching element that is adapted for changing the characteristics of an optical fiber transmission path in response to an optical control signal.

More specifically, the instant invention exemplarily is embodied in an article that comprises a photostrictive switching element for directing, responsive to an optical control signal applied to a photostrictive member, signal radiation of wavelength $\lambda$ from a signal radiation input port to a predetermined one of a plurality of signal radiation output ports.

Significantly, the photostrictive member is disposed such that a dimensional change of the member in response to the optical control signal results in a change in the relative position between an optical fiber and another element (e.g., a further optical fiber, a mirror, a corrugated member adapted for producing a refractive index grating in an optical fiber), such that said signal radiation is directed to said predetermined signal radiation output port.

The instant invention is also embodied in an article that comprises an input port, one or more output ports and an optical signal path between the input port and an output port, which signal path is modifiable in response to an optical control signal. The article comprises a photostrictive member, disposed such that a dimensional change of the member in response to the optical control signal results in a change in relative position between an optical fiber and another element (as exemplified above) such that signal radiation is directed to a predetermined output port. In currently preferred embodiments of the invention the switching element and the optical control signal are selected such that the dimensional change of the photostrictive member is relatively small, exemplarily less than the signal wavelength $\lambda$, as the optical control signal is switched between a first and a second intensity. However, the invention is not limited to embodiments that have such small dimensional change, and can be embodied in articles wherein the photostrictive member undergoes a dimensional change substantially greater than $\lambda$, exemplarily 10 $\lambda$ or even greater.

BRIEF DESCRIPTION OF THE DRAWINGS

The figures are not drawn to scale. Like features in different figures generally are designated by the same reference numeral.

DETAILED DESCRIPTION OF SOME EXEMPLARY EMBODIMENTS

The photostrictive effect is known and does not require detailed exposition. A known and currently preferred photostrictive material is (Pb, La) (Zr, Ti) $O_3$. However, practice of the invention does not require use of this material, and the use of other photostrictive materials is also contemplated.

Switching elements according to the invention typically can utilize any chemically and mechanically stable photostrictive material, and thus are not limited to the currently known photostrictive materials. Photostrictive members useful in the practice of the invention typically are polycrystalline ceramic bodies, but use of single crystal bodies is not precluded.

A representative body of photostrictive material can be made, for instance, by conventional hot pressing and sintering. If desired, the resulting sintered ceramic body can then be shaped by any appropriate technique, e.g., grinding. An important aspect of the manufacture of ceramic photostrictive bodies for use in switching elements is the "poling" of the bodies. Exemplarily, a ceramic body is heated to a temperature above its ferroelectric transition temperature, e.g., about 150° C. An electric field is applied in a predetermined direction, and the body is allowed to cool through the ferroelectric transition temperature in the electric field. As those skilled in the art will recognize, poling as described breaks the symmetry of the ceramic material and establishes a preferred direction, such that illumination of poled photostrictive material with radiation of appropriate wavelength results in strain in the photostrictive material. Typically such illumination results in strain in the poling direction.

Next we will describe a variety of exemplary switching elements according to the invention. The examples involve guided propagation of light in optical fibers.

Figure 1:
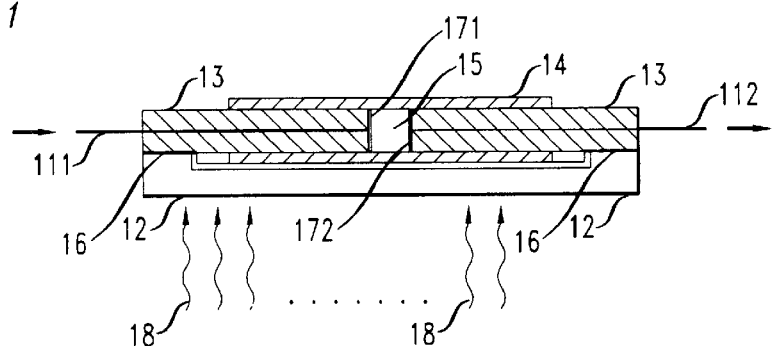
FIGS. 1–3 schematically depict exemplary interferometric switching elements according to the invention.

FIG. 1 schematically depicts an exemplary interferometric switching element, wherein numerals 111 and 112 refer to the input optical fiber and output optical fiber, respectively, numeral 12 refers to a photostrictive support body, and numerals 18 refer to the optical control signal. Fibers 111 and 112 can be considered the input and output port, respectively. The fibers are terminated in known manner in appropriate ferrules 13 (e.g., glass or ceramic ferrules with an axial bore that accommodates the fiber, with the adhesively attached to the ferrule). The ferrules are maintained in axial alignment by alignment sleeve 14. The ferrules are attached (e.g., soldered or adhesively) to support body 12 at pedestals 16 such that the two ferrules (and thus the fibers) are spaced apart. Numeral 15 refers to the space between the ferrules, and numerals 171 and 172 refer to optional reflective coatings on the ferrule endfaces. The space between the ferrules functions as a Fabry-Perot cavity. If the desired switching element is a normally "on" 1×1 switch, then the cavity length is selected such that there is constructive interference of the signal radiation at the cavity faces (typically with the control signal "off"). Exposing the support body to the optical control signal induces a length change in the body, such that the cavity length is changed. Typically the control signal is selected such that there is destructive interference of the signal radiation at the cavity faces. As those skilled in the art will recognize, in the case of constructive interference, the signal radiation propagates in the downstream direction in fiber 112, and in the case of destructive interference substantially no signal radiation is transmitted through the switching element. They will also appreciate that a change of cavity length by λ/4 (where λ is the wavelength of the signal radiation) results in a change from constructive to destructive interference, or vice versa. Thus, a very small dimensional change of the photostrictive support body can result in switching of the signal radiation.

The above-described optical switch resembles a known device (see U.S. Pat. No. 4,861,136), with the fundamental difference that the prior art device utilizes a piezoelectric member and applied voltage to vary the cavity length, whereas the instant switching element utilizes a photostrictive member and an optical control signal, and thus is an all-optical device.

Figure 2:
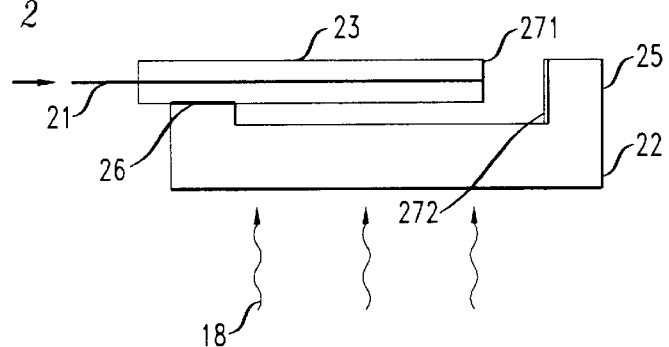

FIG. 2 schematically shows a further exemplary photostrictive switching element, wherein numeral 21 refers to an optical fiber that is adhesively fixed in the axial bore of ferrule 23, and numeral 22 refers to the photostrictive support body. The ferrule is attached to pedestal 26 such that the end face of the ferrule is spaced from extension 25 of the support body. Optionally mirrors 271 and 272 are provided. Twice the spacing between the ferrule endface and extension 25 (or between the optional mirrors) corresponds to the length of a Fabry-Perot cavity. For a first predetermined cavity length input signal radiation is substantially reflected back into the fiber and propagates in the fiber in the upstream direction, and for a second predetermined cavity length (exemplarily differing from the first length by λ/4) substantially no signal radiation is reflected back into the fiber. The cavity length is switched between first and second cavity lengths by means of control radiation 18. Fiber 21 can be considered to be both the input port and the output port.

Figure 3:
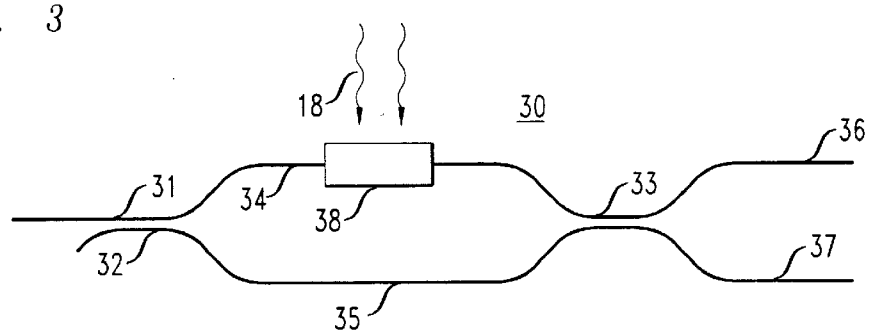

A further exemplary device 30 is schematically depicted in FIG. 3, wherein numerals 31, 36 and 37 refer to the input fiber and first and second output fiber, respectively. Numerals 32 and 33 refer to conventional 3 dB couplers, and numerals 34 and 35 refer to the two waveguide arms of a Mach-Zehnder interferometric device. The above-recited features of device 30 are conventional. As is well known, in a Mach-Zehnder device as shown, the output signal can appear at output fiber 36 or 37, depending on the phase relationship between the portion of the signal radiation that has traveled through arm 34 and the portion that has traveled through arm 35. Element 38 comprises a photostrictive member disposed such that it can receive control signal radiation, with the length of interferometer arm 34 being a function of the control signal intensity. Thus, the signal can appear at output fiber 36 or 37, depending on the intensity of the control signal radiation. The device of FIG. 3 thus clearly is a photostrictive light switch.

The above described elements according to the invention are all of the interferometric type. However, the invention is not limited to use in interferometric elements.

Figure 4:
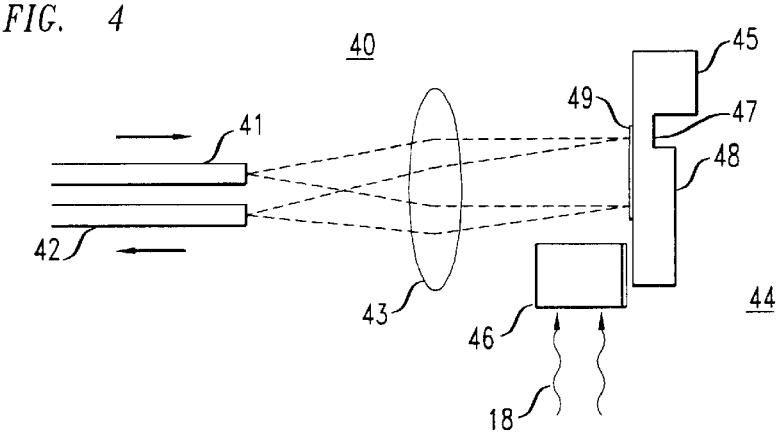
FIG. 4 schematically shows an exemplary beam steering switching element according to the invention.

The invention for instance can also be embodied in devices of the "beam steering" type, wherein the photo-induced dimensional change is used to switch the signal radiation from one path to another. FIG. 4 schematically depicts an exemplary device 40 of the beam steering type, wherein numerals 41 and 42 designate an input fiber and an output fiber, respectively. Signal radiation from the input fiber is collimated by lens 43 and reflected by mirror 49 disposed on element 44. Photostrictive member 46 is responsive to the optical control signal 18. For instance, the mirror and the photostrictive member are disposed such that for one control signal intensity (e.g., no control signal) the reflected signal radiation impinges on fiber 42 and is coupled into the fiber, and for another control signal intensity the photostrictive member applies a force on the mirror that causes a change in the position of the mirror, such that the reflected signal radiation does not impinge on fiber 42. Instead, the reflected signal radiation could, for instance, be directed back into fiber 41. It will be understood that device 40 could, for instance, be implemented on a Si chip, with element 44 formed by a known micromechanical technique such that a portion (e.g., 45) of the element is attached to the chip, and with another portion (e.g., 44 and 48) being moveable with respect to the chip. Numeral 47 designates a "hinge" that facilitates motion of the mirror in response to the force applied to the moveable element by the photostrictive element. The photostrictive member is attached to the chip such that the member is free to undergo dimensional change in response to the control signal, and such that the dimensional change can cause a positional change of the mirror.

A photostrictive element can also be used in an evanescent coupling-type switching element. As is well known, in coupled waveguides the optical power can be transferred from one waveguide to the other, the transfer taking place over the coupling length. The coupling length is determined by the coupling constant, which in turn inter alia depends on the separation between the waveguides. In devices according to the invention this separation can be changed by means of a photostrictive element in response to an optical control signal.

Figure 5:
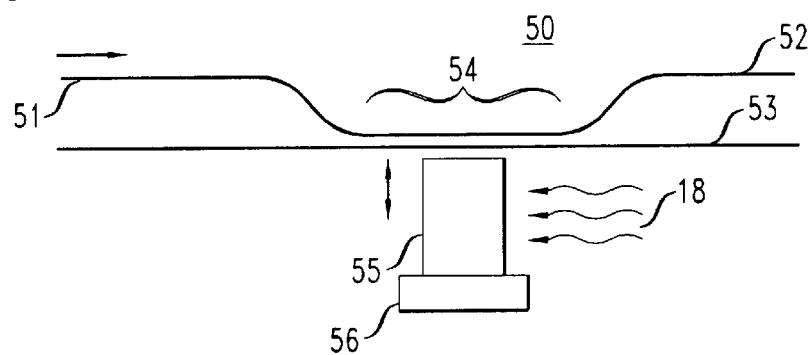
FIG. 5 schematically shows an exemplary evanescent field switching element according to the invention.

FIG. 5 schematically depicts an exemplary evanescent coupling-type switching element 50 according to the invention, wherein numeral 51 refers to the input fiber and numerals 52 and 53 to the output fibers. In coupling region 54 the fibers are disposed in coupling relationship, i.e., such that the evanescent fields of the two fibers overlap. Member 56 is fixed relative to fiber 51, with photostrictive element 55 attached to member 56 such that, in response to an optical control signal, the photostrictive element changes the spacing between the fibers in the coupling region. For instance, in the absence of the optical control signal the spacing between the fibers is such that the signal radiation is coupled from fiber 51 into fiber 53, and when the control signal is applied the spacing between the fibers is such that the signal radiation is coupled from fiber 51 to fiber 52.

Changing the spacing between the optical fibers is not the only way a photostrictive evanescent coupling-type switching element can be implemented. Switching can be achieved whenever the coupling constant between the fibers can be changed in response to the optical control signal. This could, for instance, be achieved by changing the optical properties of the coupling region, e.g., by moving a member into or out of the coupling region.

The above-described evanescent field-type coupling is a special case of mode coupling, and a photostrictive member can advantageously be used in a switching element of the mode coupling-type.

Figure 6:
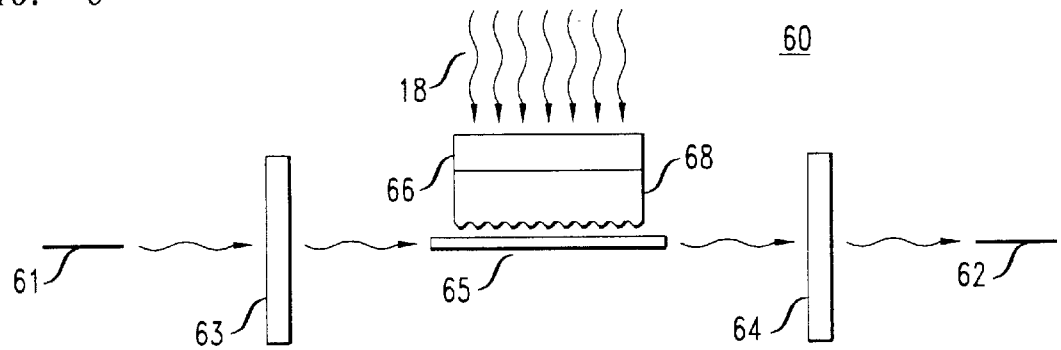
FIGS. 6 and 7 schematically depict exemplary mode coupling switching elements according to the invention.

FIG. 6 schematically illustrates a switching element 60. Numerals 61 and 62 refer to the input fiber and output fiber, respectively, 63 and 64 refer to polarizers, 65 refers to a length of polarization-maintaining fiber, and 66 and 18 refer to the photostrictive member and the control light. Numeral 68 refers to a member with a corrugated surface, positioned to induce mode coupling, that can be urged by the photostrictive member against the polarization maintaining fiber.

As is well known, in polarization-maintaining fiber the two polarization states differ with respect to their propagation constant ($\beta_1$, $\beta_2$); and therefore there is little or no transfer of energy from one state to the other. By introducing an appropriate index perturbation on the polarization maintaining fiber, the light can be switched from one state to the other. The index perturbation is introduced into the fiber by urging the corrugated surface against the fiber. The period ($\Lambda$) of the corrugation is selected such that $(2\lambda/\Lambda)=|\beta_1-\beta_2|$. Thus, without index perturbation in the fiber, light leaves the switching element in the same polarization state in which it entered, and with the index perturbation the light leaves the switching element in the other polarization state. By means of polarizers the switching between polarization states can be translated into amplitude variations. For instance, for crossed polarizers, little or no light reaches the output fiber in the absence of the control light, and light reaches the output fiber if the control light is on.

Figure 7:
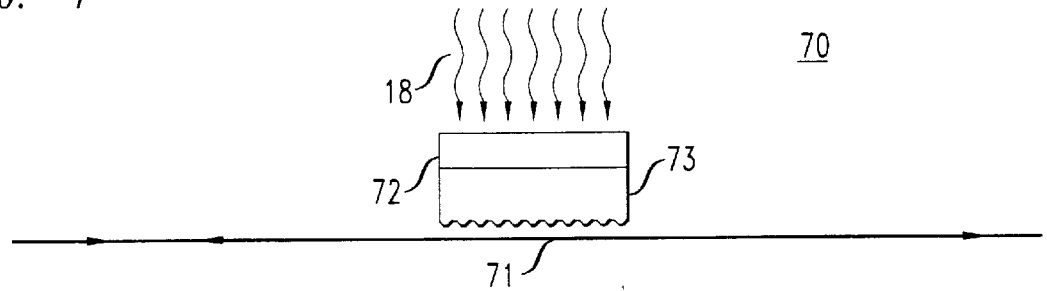

The above described switching element utilizes co-directional coupling, i.e., the modes propagate in the same direction. However, a switching element according to the invention can utilize contra-directional coupling. Such an element 70 is schematically depicted in FIG. 7, wherein numeral 71 refers to the optical fiber, and numerals 72, 73 and 18 refer to the photostrictive body, the corrugated element and the control light, respectively. The period of the corrugation ($\Lambda$) is selected such that $(2\pi/\Lambda)=2\beta$ where $\beta$ is the propagation constant of the light in the fiber. By urging the corrugation against the fiber, a corresponding refractive index perturbation is introduced in the fiber, and the light in the fiber is reflected, to propagate in the upstream direction. On the other hand, in the absence of control light, no refractive index perturbation is introduced, and the light continues in the downstream direction.

The corrugated surfaces can be produced by known techniques, e.g., by conventional photolithography and etching, including anisotropic etching of a Si surface that can produce precisely defined V-grooves of predetermined width and depth. However, the surface urged against the fiber is not necessarily a corrugated one, and embodiments in which the mode evolution in an optical fiber can be affected by application of a spatially constant (i.e., constant over a predetermined length of the fiber) stress are contemplated.

Figure 8:
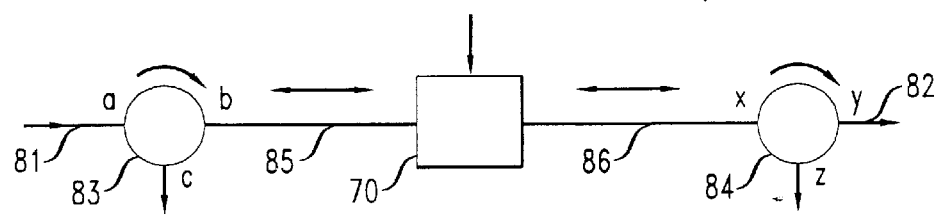
FIG. 8 schematically shows an exemplary all-optical add/drop device according to the invention.

By way of example, a contra-directional switching element as described above can, in conjunction with known devices, provide an all-optical add/drop device, as schematically illustrated in FIG. 8, wherein numeral 70 refers to a switching element of the type shown in FIG. 7, and numerals 83 and 84 refer to conventional circulators. Signal radiation (providing one or more channels) arrives on fiber 81, enters port "a" of circulator 83, and is coupled at port "b" into fiber 85. If switching element 70 is not activated then the signal radiation passes through the switching element in fiber 86, enters port "x" of circulator 84 and is coupled at port "y" into fiber 82 for utilization at a downstream point. On the other hand, if switching element 70 is activated then the signal radiation on fiber 85 is reflected, returns to port "b" of circulator 83, and is available at port "c" for utilization. It will be understood that typically switching element 70 is selected to reflect a single channel of a WDM system and to pass the other channels. This channel will be dropped if the switching element is activated, as described above. The channel can also be added (at the same wavelength but with different information) by coupling it into port "z" of circulator 84. At port "x" the light is coupled into fiber 86, transmitted to (activated) switching element 70 where it is reflected back into fiber 86, is coupled into port "x" of circulator 84, and is coupled into fiber 82 at port "y", for utilization at a downstream location.

Figure 9:
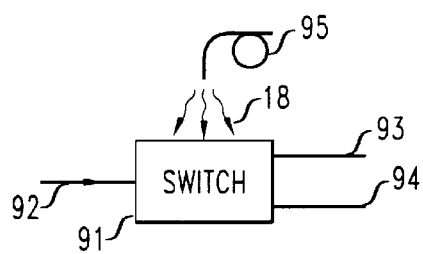
FIGS. 9 and 10 schematically illustrate exemplary arrangements for providing the optical control signal to a switch according to the invention.

A characteristic feature of switching elements according to this invention is the presence of a control signal port that is adapted for use of electromagnetic radiation as the control signal. Such ports can take many forms. For instance, a separate optical fiber can carry the control signal to the switching element, where the control light is caused to impinge on the photostrictive element, as schematically shown in FIG. 9. In that figure, numeral 91 refers to a switching element (not shown in detail), 92 refers to the signal input fiber, 93 and 94 to the respective output fibers, 95 to the optical fiber that carries the control light to the switching element, and 18 refers to the control light that is caused to impinge on the photostrictive body. Conventional optical elements (e.g., lenses, a stop) could be used in known manner to condition the beam emitted from fiber 95. Means for switching the control light on or off are required but are not shown.

Figure 10:
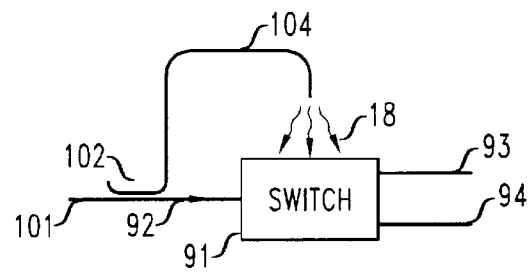

FIG. 10 schematically shows a further embodiment that does not require a separate fiber to carry control light from a remote location to the switching element. Specifically, fiber 101 carries both the signal radiation and control radiation, with the latter coupled from the fiber by any suitable means, exemplarily wavelength-sensitive coupler 102. The coupled-out control light 18 is then caused to impinge on the photostrictive element, exemplarily using a short length of optical fiber 104. It will be appreciated that wavelength is not the only possible characteristic by which to distinguish control light from signal light. For instance, signal and control light can differ in their polarization characteristics, and this could be used to separate the control light from the signal light.

Figure 11:
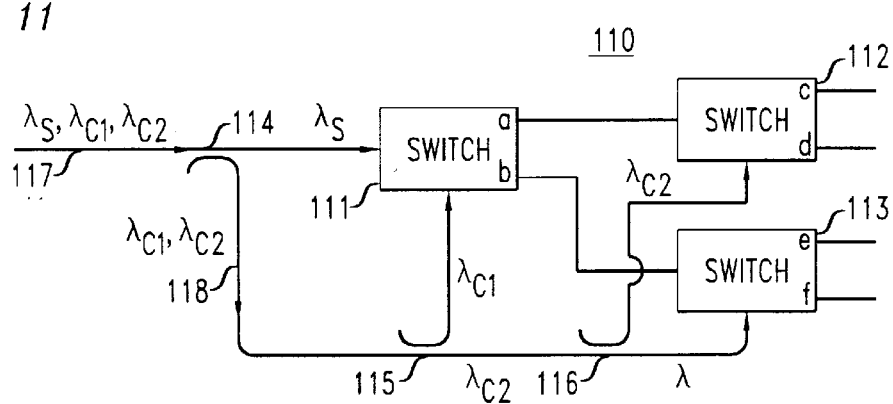
FIG. 11 schematically shows an exemplary 1×4 switch according to the invention.

The process of extracting control light from combined signal and control light (with use of the extracted control light to effect a dimensional change in the photostrictive element) can be extended to a cascaded array of switching elements, as shown schematically in FIG. 11 which schematically depicts a 1×4 switch.

1×4 switch 110 comprises three switching elements 111, 112 and 113 as discussed above, two wavelength-dependent couplers 114 and 115 or other suitable wavelength-discriminating elements, and wavelength-independent (over an appropriate wavelength region) coupler 116. Such couplers are known. Input fiber 117 carries signal radiation of wavelength $\lambda_s$ (possibly more than one channel) and one or more of control radiation of wavelength $\lambda_{c1}$ and $\lambda_{c2}$. The signal radiation passes through coupler 114 to the input port of switch 111, and the control radiation is coupled into fiber 118 and propagates to coupler 115, selected to remove control radiation $\lambda_{c1}$ from the control light, with $\lambda_{c1}$ providing the control input to switch 111. Control radiation $\lambda_{c2}$ continues on to coupler 116 which distributes it to the control inputs of switching elements 112 and 113. Assuming that the three switching elements are selected such that the output appears at the "upper" output port (i.e., port a, c or e) if the respective control input is "on", the 1×4 switch of FIG. 11 has the following truth table.

Truth Table

| $\lambda_{c1}$ $\lambda_{c2}$ | ON | OFF |
|---|---|---|
| ON | c | e |
| OFF | d | f |

The described switch architecture can readily be extended to 1×N switches, with N>4.

Latching is a desirable feature of switching elements, and switching elements according to the invention can be constructed to exhibit the feature. That is to say, switching elements according to the invention can be switched with an optical control signal, and can be designed such that, after switching is accomplished, the control signal can be removed without change in the state of the switching element. The "latch" generally has to be removed before the switching element can change the switching state. Without latching, the element will remain in the switched state only as long as the control light is on.

Latching can be effected in a variety of ways. For instance, the switching element can be held in place by a mechanical detent or ratcheting arrangement. Currently preferred are switching elements according to the invention with optical latching, exemplified by an embodiment that is schematically depicted in FIG. 12.

Figure 12:
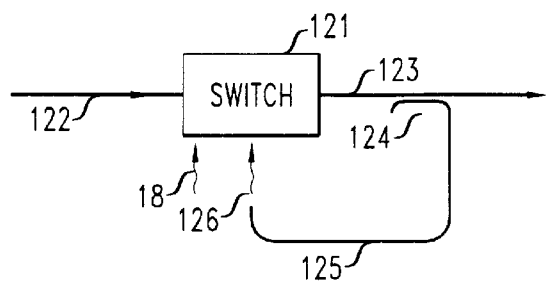
FIG. 12 schematically shows an exemplary switch with optical latching.

In FIG. 12, switch 121 is a switch according to the invention, exemplarily as depicted in FIG. 1. Signal radiation propagates on input fiber 122 to the switch and continues downstream on output fiber 123, provided control radiation 18 is initially "on" such that the switch is in the transmissive state. The output fiber comprises a conventional splitter 124 that removes a portion 126 of the signal radiation from the transmission path, that portion being caused to impinge on the photostrictive element of the switch, such that the switch is maintained in the "on" state after removal of control radiation 18. Thus, the switch is latched. To unlatch the switch, the signal radiation can be momentarily switched off.

In another embodiment, the switching element is held in the switched state by electrical means (e.g., a solenoid) that are activated when the element is switched. This embodiment typically requires electrical power sources in the field, but has the advantage that the switching intelligence is optically derived from a remote site (e.g., a central office).

Figure 13:
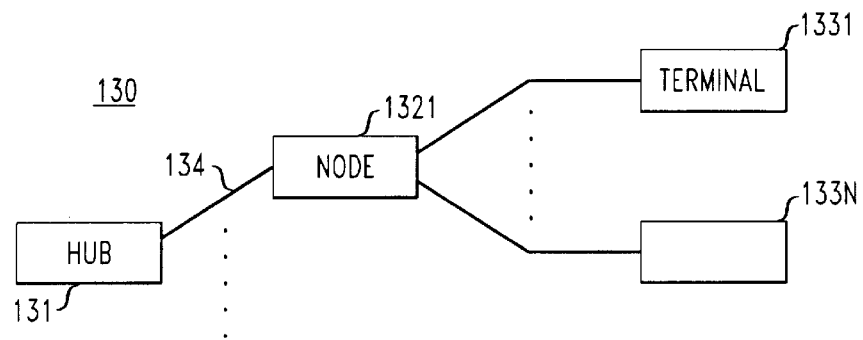
FIG. 13 schematically shows relevant features of an exemplary optical communication system according to the invention.

Devices that comprise a photostrictive switching element according to this invention can be incorporated into optical fiber communication systems in a variety of ways, and have the advantage of all-optical operation. An exemplary system is schematically shown in FIG. 13, wherein system 130 comprises hub terminal 131 connected to a remote node 1321 by a single feeder fiber 134, with the node connected to remote terminals 1331–133N. The remote node comprises a 1:N switch according to this invention, whereby a low loss signal path can be provided between the hub and a selected one of the remote terminals. In substantially similar manner, photostrictive switching elements can be used to provide switching or commutating for the delivery of services to a group of subscribers, or to provide alternate routing and/or provisioning paths for services in the event of system failures or outages.

A further exemplary system is a passive optical network (PON) that comprises switching elements according to the invention. For information on PONs see, for instance, U.S. Pat. Nos. 5,285,305 and 5,321,541, and J. R. Stern et al., *Electronic Letters*, Vol. 23, p. 1255 (1987), all incorporated herein by reference.

Figure 14:
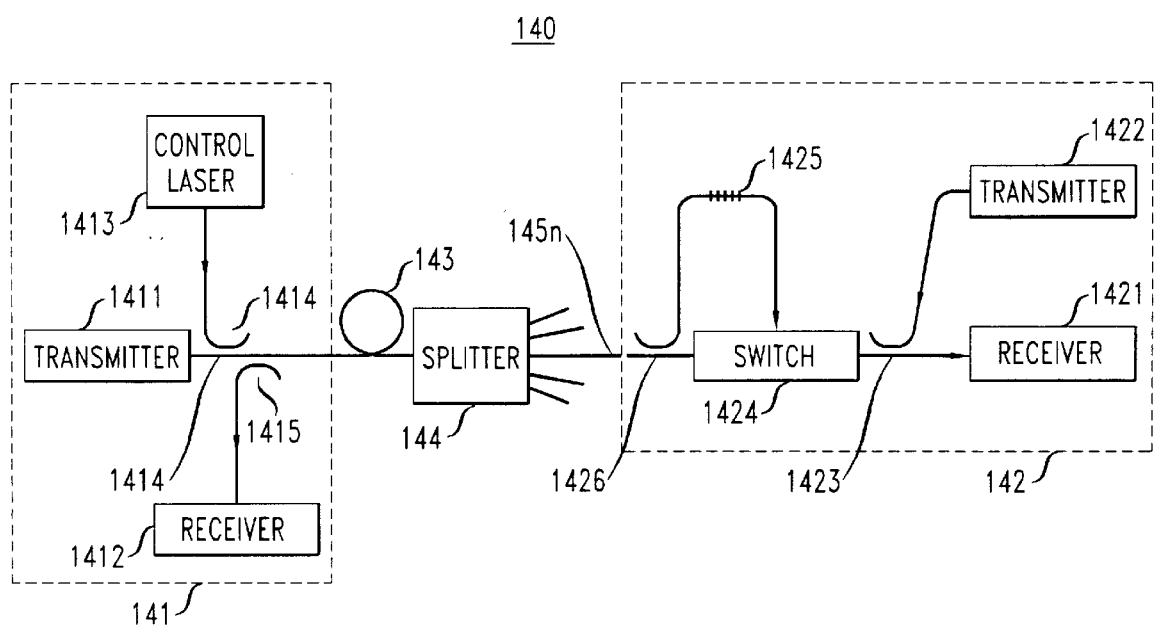
FIGS. 14 and 15 schematically show exemplary passive optical networks according to the invention.

FIG. 14 schematically depicts an exemplary PON 140 with switching elements according to the invention that facilitate remote interdiction of upstream signals, as will be explained below.

In FIG. 14, broken line 141 encloses the portion of the network that is located at a hub, exemplarily a central office, and broken line 142 the portion that is located at a remote terminal, exemplarily subscriber premises. The network utilizes light of one wavelength (e.g., 1.55 $\mu$m) for downstream communication, light in another wavelength region (e.g., 1.3 $\mu$m) for upstream communication, and control radiation in still another wavelength region for activating switch 1424. Conventional single mode transmission fiber 143 carries light between the hub and conventional splitter 144. The splitter typically is located relatively close to the N subscribers (N$\geq$2) served by the PON.

The hub portion of the network comprises transmitter 1411 that provides the downstream signal, receiver 1412 that receives the upstream signal, and control laser 1413. Control light is coupled into the common transmission path by conventional coupler 1414, and upstream signal light is coupled out of the common transmission path by conventional coupler 1415.

After transmission of the downstream radiation from the hub to the conventional splitter 144, the downstream radiation is divided into N substantially equal portions. A given portion is transmitted through conventional fiber 145*n* (n≦N) to the n'th subscriber premises. At the premises, conventional coupler 1426 couples the control light out of the portion, with the remainder of the portion passing through switch 1424 to receiver 1421. Upstream transmitter 1422 provides upstream light that allows the subscriber to communicate with the hub, and that is coupled into the transmission path by means of conventional coupler 1423.

The PON of FIG. 14 is conventional, with the exception of the features that make possible remote interdiction of communications with one or more subscribers. This interdiction capability addresses a significant problem, as will now be described.

In a conventional PON, each subscriber has equal access to the hub, on a time-division multiple access (TDMA) basis. Thus, each subscriber is potentially able (e.g., through equipment failure) to corrupt all upstream communication. This disadvantage is a consequence of the fact that successful operation of a conventional TDMA protocol requires that all subscribers transmit only on their agreed-upon time slots. If a subscriber transmits on unassigned time slots, then the upstream data is corrupted, potentially for all of the subscribers of the PON. Since the most likely reason for the failure of a subscriber to transmit only on the assigned time slot is equipment malfunction, adherence to the protocol by the offending subscriber may not be possible, and removal of the subscriber from the network is the only short term solution for restoring full service to the other subscribers. The PON of FIG. 14 provides this capability.

In order to determine which subscriber is not adhering to the TDMA protocol, the hub terminal has to have the ability to address the photostrictive switches individually. This can be achieved, for instance, by providing each subscriber with a wavelength specific element (typically a conventional fiber grating 1425), and stepping the control laser through the N assigned wavelengths, thereby actuating the switches in succession, until the offending unit is identified and removed from the PON.

Provision of gratings is not the only way of enabling the system to individually address the photostrictive switches. For instance, the switches can be designed to have mechanical resonances at frequencies that vary from switch to switch. This is readily achievable since such resonance frequencies depend on device parameters such as size and composition. Addressing such a switch with control light that is amplitude modulated at one of the resonance frequencies of the switch thus can result in relatively large photostritive response, whereas the response of the other (non-resonant) switches will be small. The large photostrictive response of the resonant element can, for instance, be used to actuate a limit switch. The above described PON according to the invention is exemplary only, and PONs of different architecture are possible.

Figure 15:
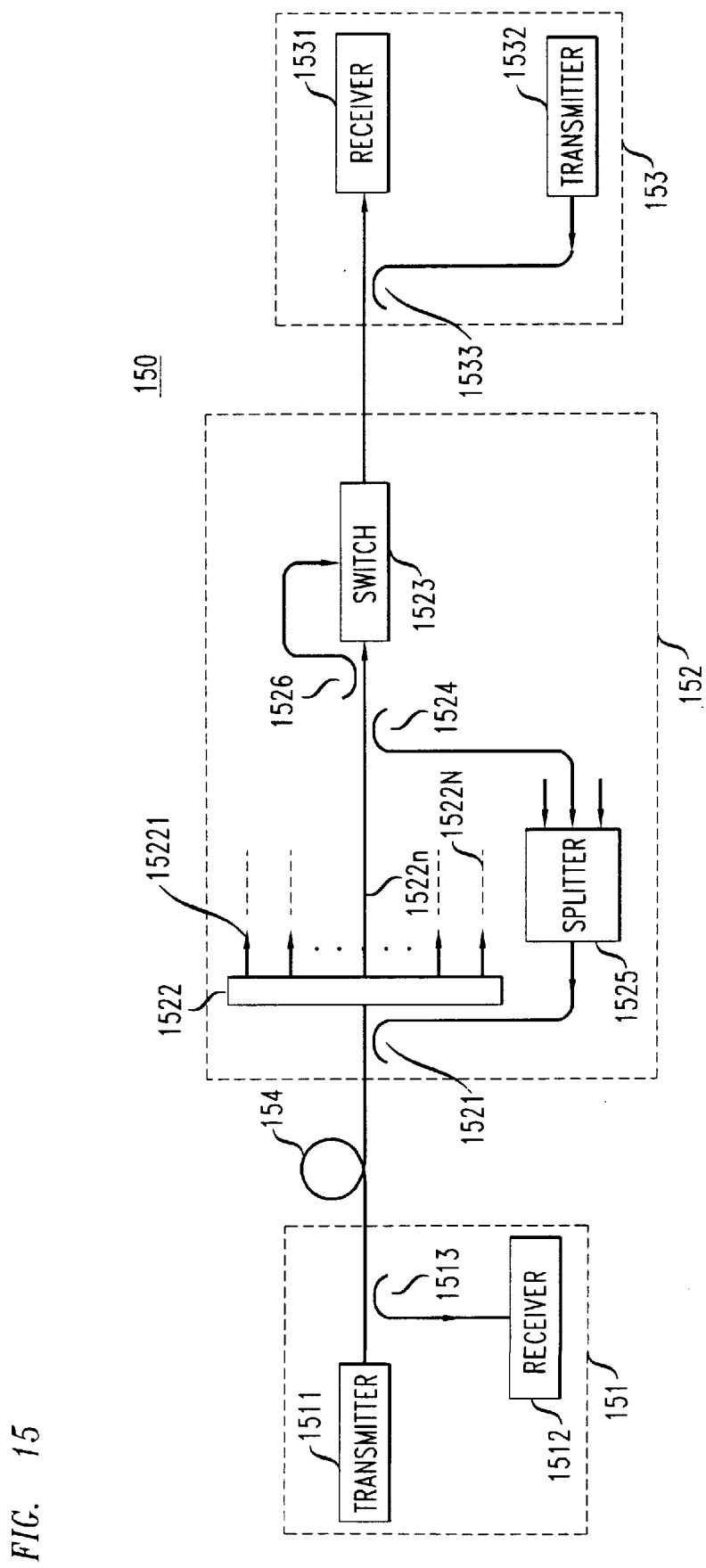

FIG. 15 schematically shows a further exemplary PON. The optical communication system 150 is of the type that is frequently referred to as "two PONs in one". Broken lines 151 and 153 enclose the portions of the system that are located at the hub and at the subscriber premises, respectively, and broken line 152 encloses a portion that typically is located close to the subscriber premises.

Numeral 1511 refers to a multichannel signal transmitter, 1512 refers to an upstream receiver (e.g., at 1.3 $\mu$m), and 1513 refers to a conventional coupler. The signal transmitter typically has N channels at wavelengths $\lambda_1, \lambda_2 \ldots \lambda_N$, where N is the number of subscribers served by the network. The signal channels typically are at or near 1.55 $\mu$m.

The signal radiation is transmitted through conventional single mode transmission fiber 154 to the vicinity of the subscriber premises and enters router 1522, where it is divided into N different outputs 15221 . . . 1522N. Such routers are known. Exemplarily it is a router of the "Dragoni" type.

Output 1522*n* is representative of the N outputs. It proceeds through photostrictive switch 1523 to the n'th subscriber premises, where it is received by receiver 1531. At the premises is also located transmitter 1532 for upstream communications, typically at 1.3 $\mu$m and using a TDMA protocol. The upstream signal is coupled into the main transmission path by means of coupler 1533, passes through photostrictive switch 1523, and is coupled out of the main transmission path by coupler 1524. The "main" transmission path is the direct path between the signal transmitter and a given subscriber receiver. The coupled-out upstream signal is provided to the n-th input port of splitter 1525, appears at the single output of the splitter, and is coupled into the main transmission path by coupler 1521. After propagating in transmission fiber 154 to the hub, the upstream signal is coupled from the main transmission path by coupler 1513 and provided to upstream receiver 1512.

For the reasons given above, it would be desirable to be able to remove a non-conforming subscriber from the network. This is facilitated by the photostrictive switches, of which there is one in every main transmission path. These switches can be sequentially actuated to determine the non-conforming subscriber. Exemplarily this is accomplished as follows:

The "Dragoni" router generally demultiplexes N WDM channels, e.g., $\lambda_1, \lambda_2 \ldots \lambda_N$, and can also demultiplex one or more further sets of WDM channels, e.g., $\lambda_{N+1}, \lambda_{N+2} \ldots \lambda_{2N}$. The further set corresponds to the first set, appropriately shifted in wavelength. Thus, transmitter 1511 can have WDM signals at $\lambda_1, \lambda_2 \ldots \lambda_N$, and further can provide control signals at $\lambda_{N+1}, \lambda_{N+2} \ldots \lambda_{2N}$. By sequentially providing control signals to the "Dragoni" router and coupling the respective control signals from the main transmission path by the respective couplers (e.g., coupler 1526), the switches can be sequentially actuated and the non-conforming subscriber determined and interdicted remotely.

It will be understood that the above described system is exemplary only. For instance, a separate control laser could be provided, and the output thereof coupled into the main transmission path in conventional fashion.

Those skilled in the art will appreciate that there are many potential applications for photostrictive switches according to the invention in optical communication systems. All these applications are contemplated. Furthermore, it will be appreciated that photostrictive switches of the type disclosed in U.S. Pat. No. 5,502,781 could be used in PONs. However, this is not preferred for, e.g., cost and loss reasons, since photostrictive members according to this invention can be inexpensively mass produced, and since switching elements according to the invention can be inserted into an optical fiber system by means of conventional connectors or splices at low insertion loss.

The invention claimed is:

1. An article comprising a switching element for directing, responsive to an optical control signal applied to a photostrictive member, signal radiation of wavelength $\lambda$ from a signal radiation input port to a predetermined radiation output port;

CHARACTERIZED IN THAT the photostrictive member is disposed such that a dimensional change of the member in response to the optical control signal results in a change in relative position between an optical fiber and another element, such that the signal radiation is directed to the predetermined signal radiation output port.

2. Article according to claim 1, wherein the optical control signal differs in wavelength from the signal radiation.

3. Article according to claim 1, wherein said optical control signal and said photostrictive member are selected such that, upon change of the impinging optical control signal between a minimum and a maximum control signal intensity, a dimension of the photostrictive member changes by $\lambda$ or less.

4. Article according to claim 1, wherein said member comprises Pb—La—Zr—Ti—oxide.

5. Article according to claim 1, wherein said other element is an optical fiber.

6. Article according to claim 1, wherein said other element is selected from the group consisting of corrugated members and mirrors.

7. Article according to claim 1, wherein said photostrictive switching element is an interferometric switching element that comprises a Fabry-Perot cavity for the signal radiation.

8. Article according to claim 1, wherein said photostrictive switching element is a Mach-Zehnder interferometric switching element comprising an arm that comprises said photostrictive member.

9. Article according to claim 1, wherein said photostrictive switching element is a beam-steering switching element comprising a variable position mirror element for reflecting signal radiation, with the position of the mirror element controlled by said photostrictive member.

10. Article according to claim 1, wherein said photostrictive switching element is an evanescent field coupling switching element comprising first and second spaced apart optical fibers, with the spacing between said optical fibers controlled by said photostrictive member.

11. Article according to claim 1, wherein said photostrictive switching element is a mode-conversion switching element comprising means, controlled by said photostrictive member, for inducing a refractive index variation in said optical fiber such that said signal radiation undergoes a mode conversion.

12. Article according to claim 11, wherein the article is an all-optical add/drop device that further comprises a first circulator upstream of said switching element and signal-transmissively connected thereto, and a second circulator downstream of said switching element and signal transmissively connected thereto, such that a signal is added or dropped in response to the control signal impinging on said photostrictive member.

13. Article according to claim 1, the article comprising a multiplicity of switching elements connected to form a 1×N optical switch, where N is an integer greater than or equal to 2.

14. Article according to claim 1, wherein the switching element is a latching switching element that comprises latching means that hold the switching element in an ON state after removal of the control signal.

15. Article according to claim 1, wherein the article is an optical communication system comprising a hub, a node remote from the hub and signal-transmissively connected to the hub, and further comprising a multiplicity of subscriber terminals signal-transmissively connected to the node, wherein the hub comprises a signal transmitter, and the node comprises a plurality of said switching elements selected such that the distribution of the signal radiation to the subscriber terminals is controlled by control signals applied to the switching elements.

16. An article according to claim 1, the article comprising a passive optical network adapted for downstream communication from a downstream signal transmitter to a multiplicity N of subscriber terminals, and further adapted for upstream communication from an upstream transmitter to an upstream receiver, wherein the downstream signal transmitter and upstream receiver are located in a hub that is spaced from the subscriber terminals and is signal transmissively connected to the subscriber terminals by optical fiber, and wherein each of said multiplicity of subscriber terminals comprises a switching element activateable from the hub and selected such that the upstream communication from a given subscriber terminal can be prevented from reaching the upstream receiver.

17. Article according to claim 16, wherein the passive optical network comprises a 1×N downstream signal splitter that divides the downstream signal from the downstream transmitter into N substantially identical downstream signals and is disposed between the hub and the subscriber terminals, with each of said subscriber terminals provided with one of said N substantially equal downstream signals during normal network operation.

18. Article according to claim 16, wherein the passive optical network comprises a downstream signal router that demultiplexes an N-channel frequency multiplexed downstream signal from the downstream transmitter and is disposed between the hub and the subscriber premises, with each of said N channels provided to predetermined subscriber premises during normal network operation.

19. An article comprising an input port, one or more output ports, and an optical signal path between the input port and an output port, which optical signal path is modifiable in response to an optical control signal;

CHARACTERIZED IN THAT the article comprises a photostrictive member, disposed such that a dimensional change of the member in response to the optical control signal results in a change in relative position between an optical fiber and another element, such that signal radiation is directed to a predetermined output port.

* * * * *